United States Patent
Char et al.

(10) Patent No.: US 10,920,024 B2
(45) Date of Patent: Feb. 16, 2021

(54) POLYSULFIDE COPOLYMER PARTICLE AND METHOD OF PREPARING THE SAME

(71) Applicant: SEOUL NATIONAL UNIVERSITY R&DB FOUNDATION, Seoul (KR)

(72) Inventors: Kookheon Char, Seoul (KR); Jeewoo Lim, Seoul (KR); Unho Jung, Gimpo-si (KR); Won Tae Joe, Daejeon (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/722,343

(22) Filed: Dec. 20, 2019

(65) Prior Publication Data
US 2020/0140627 A1 May 7, 2020

Related U.S. Application Data

(63) Continuation of application No. 15/716,625, filed on Sep. 27, 2017, now abandoned, which is a continuation of application No. PCT/KR2016/003135, filed on Mar. 28, 2016.

(30) Foreign Application Priority Data

Mar. 27, 2015 (KR) .................. 10-2015-0043551

(51) Int. Cl.
C08J 3/09 (2006.01)
C08L 81/02 (2006.01)
C08J 3/12 (2006.01)
C08G 75/0254 (2016.01)

(52) U.S. Cl.
CPC .......... *C08J 3/097* (2013.01); *C08G 75/0254* (2013.01); *C08J 3/096* (2013.01); *C08J 3/12* (2013.01); *C08L 81/02* (2013.01); *C08J 2381/02* (2013.01)

(58) Field of Classification Search
CPC ... C08J 3/097; C08J 3/096; C08J 3/12; C08G 75/025; C08G 75/0254; C08G 75/14; C08G 75/0263; C08G 75/0268; C08G 75/0259; C08G 75/0281; B29B 13/00; C08F 6/008; C08F 6/28; B30B 9/28; C08L 81/02
See application file for complete search history.

(56) References Cited

U.S. PATENT DOCUMENTS

| | | |
|---|---|---|
| 2013/0064904 A1 | 3/2013 | Gojon-Romanillos et al. |
| 2014/0163150 A1* | 6/2014 | Hamada ................ C07C 323/12 524/380 |
| 2014/0199592 A1 | 7/2014 | Pyun et al. |

FOREIGN PATENT DOCUMENTS

WO 2013023216 A1 2/2013

OTHER PUBLICATIONS

Jeewoo Lim et al., "Recent Approaches for the Direct Use of Elemental Sulfur in the Synthesis and Processing of Advanced Materials", Angewandte Chemie International Edition, Jan. 2015, vol. 54, No. 11 pp. 3249-3258.

(Continued)

*Primary Examiner* — Shane Fang
(74) *Attorney, Agent, or Firm* — Hamre, Schumann, Mueller & Larson, P.C.

(57) ABSTRACT

The present disclosure relates to a polysulfide copolymer particle and a method of preparing the polysulfide copolymer particle.

19 Claims, 14 Drawing Sheets

(56) References Cited

OTHER PUBLICATIONS

Jeewoo Lim et al., "High Sulfur Content Polymer Nanoparticles Obtained from Interfacial Polymerization of Sodium Polysulfide and 1,2,3-Trichloropropane in Water", Macromolecular Rapid Communications, Jun. 2015, vol. 36, No. 11, pp. 1103-1107.

Jeewoo Lim et al., "Direct utilization of elemental sulfur for the synthesis of polysulfide polymer nanoparticles", Abstracts of Papers of the American Chemical Society, Aug. 13, 2014, Abstract No. 604, 1 page.

International Search Report of PCT/KR2016/003135 dated Jun. 21, 2016, 3 pages.

\* cited by examiner

POLYSULFIDE COPOLYMER PARTICLE AND METHOD OF PREPARING THE SAME

CROSS-REFERENCE TO RELATED APPLICATIONS

This application is a Continuation of application Ser. No. 15/716,625, filed Sep. 27, 2017, which is a Continuation of PCT/KR2016/003135, filed Mar. 28, 2016, claims the benefit of priority from Korean Patent Application No. 10-2015-0043551, filed on Mar. 27, 2015, the entire contents of which are incorporated herein by reference.

TECHNICAL FIELD

The present disclosure relates to a polysulfide copolymer particle and a method of preparing the polysulfide copolymer particle.

BACKGROUND

In general, sulfur has many interesting properties such as high storage capacity for an alkali metal and high molar refraction. These interesting properties are further expanded as a sulfur content is increased, and materials with a high sulfur content have been applied in a wide range of areas including secondary batteries, dynamic covalent chemistry, and high-refractive index optical materials. Further, elemental sulfur fine powder prepared by acid-induced reductive cleavage of thiosulfate has been used as non-toxic environmentally friendly pesticides for agricultural application. Due to worldwide oversupply of sulfur, the synthesis of a material with a high sulfur content form elemental sulfur has been actively pursued. In 1997, Hay and researchers demonstrated copolymerization of cyclic arylene disulfide with sulfur at an increased temperature [Y. Ding, A. S. Hay, J. Polym. Sci. A Polym. Chem. 1997, 35, 2961-2968.]. In more recent years, reactions of various olefins and elemental sulfur have been studied, and it has been found that molten sulfur can be used as a medium for the synthesis of gold nanoparticles and a polymer-gold nanoparticle complex can be obtained by introducing a divinyl cross-linker. Further, a cross-linked polymer with a sulfur content of up to 90 wt % was prepared by conducting similar copolymerization using 1,3-diisopropenylbenzene, oleic acid, and 1,3-diethynylbenzene. It is known that besides molten sulfur, inorganic polysulfide that is chain anions represented by the formula $S_n^{2-}$ and can be prepared by solving elemental sulfur in an alkaline solution reacts with a divinyl ketone derivative as well as organic dihalide and trihalide through interfacial polymerization, and, thus, a polycondensation product can be obtained. A detailed report by Tobolsky and researchers disclosed the preparation of a cross-linked elastomer through anionic copolymerization of polysulfide using polyfunctional alkyl halide [a) A. V. Tobolsky, R. B. Beevers, G. D. T. Owen, J. Colloid Sci. 1963, 18, 353-358; b) A. V. Tobolsky, G. D. T. Owen, R. B. Beevers, J. Colloid Sci. 1963, 18, 359-369; c) K. Kishore, K. Ganesh, Macromolecules 1993, 26, 4700-4705; d) K. S. Murthy, K. Ganesh, K. Kishore, Polymer 1996, 37, 5541-5543; e) S. Sundarrajan, M. Surianarayanan, K. S. V. Srinivasan, J. Polym. Sci. A Polym. Chem. 2005, 43, 638-649; f) L. Ramakrishnan, K. Sivaprakasam, J. Polym. Res. 2009, 16, 623-635.].

In spite of the interesting properties of a sulfur-rich material, a polymer with a high sulfur content is typically insoluble and thus limited in its application. One of the methods for avoiding this problem is to chemically decompose a sulfur-rich polymer in an oligomer liquid, but this method is not regarded as a general solution. Therefore, in order to further expand the applicability of the sulfur-rich polymer, a simple method of preparing a processable sulfur-rich polymer is needed.

It is interesting that a polymer nanoparticle (NP) can be easily processed as a dispersion. A sulfur-containing polymer nanoparticle was synthesized by radical polymerization of sulfur-containing olefin and ring-opening polymerization of propylene sulfide. However, the nanoparticle has disadvantages of having a content of less than 50 wt % and being prepared from a relatively high-priced starting material. Further, the nanoparticle lacks a S—S bond which is an interesting moiety for dynamic covalent chemistry and battery applications. Accordingly, there is a need for a simple method capable of preparing a polymer nanoparticle with a high sulfur content and a high S—S bond content from a low-priced source material such as elemental sulfur or its direct derivatives.

SUMMARY

The present disclosure is directed to a polysulfide copolymer particle and a method of preparing the polysulfide copolymer particle.

However, problems to be solved by the present disclosure are not limited to the above-described problems. Although not described herein, other problems to be solved by the present disclosure can be clearly understood by those skilled in the art from the following description.

One aspect of the present disclosure provides a polysulfide copolymer particle having a sulfur content of 65 wt % or more.

Another aspect of the present disclosure provides a method of preparing a polysulfide copolymer particle, including: preparing a sulfur-precursor solution containing a polysulfide salt represented by the formula $X_2S_m$ (wherein X is an alkali metal cation or ammonium cation and m is a number of from 1 to 10); and adding a surfactant and a polyfunctional monomer to the sulfur-precursor solution followed by polymerization reaction to obtain a polysulfide copolymer particle.

According to an embodiment of the present disclosure, it is possible to in-situ prepare a water-dispersible polysulfide copolymer particle (NP) having a sulfur content of 65 wt % or more through interfacial polymerization of a polyfunctional monomer and a sulfur precursor including a polysulfide salt in water.

According to an embodiment of the present disclosure, it is possible to control a formation speed of a polysulfide copolymer particle by controlling a concentration of a surfactant which can act as both a dispersing agent and a phase transfer catalyst and thus possible to easily control a size of the polysulfide copolymer particle in the range of from nanometer to micrometer.

According to an embodiment of the present disclosure, it is possible to control an m value of a polysulfide salt represented by the formula $X_2S_m$ and used in preparing a polysulfide copolymer particle by controlling a ratio of two reactants in a reaction between $Na_2S$ and S used in preparing the polysulfide salt and thus possible to easily control a size and a sulfur content of the polysulfide copolymer particle.

According to an embodiment of the present disclosure, it is possible to easily remove a cationic surfactant confined to a surface of a synthesized polysulfide copolymer particle via centrifugation in water.

According to an embodiment of the present disclosure, a cross-linked polysulfide copolymer particle having a high sulfur content of 65 wt % or more or 75 wt % or more can be obtained through interfacial polymerization in the presence of a cationic surfactant which acts as both a dispersing agent and a phase transfer catalyst, and the double function of the cationic phase transfer catalyst as a surfactant for developing the polysulfide copolymer particle can be used as a means for controlling a size of a sulfur-rich particle. Thus, the above-described method according to an embodiment of the present disclosure makes it possible to obtain a polysulfide copolymer which is typically insoluble in an organic solvent as a surfactant-free dispersion, and herein, the surfactant can be easily removed with distilled water or by repeated centrifugation-redispersion through dialysis.

DETAILED DESCRIPTION

Figure 1:
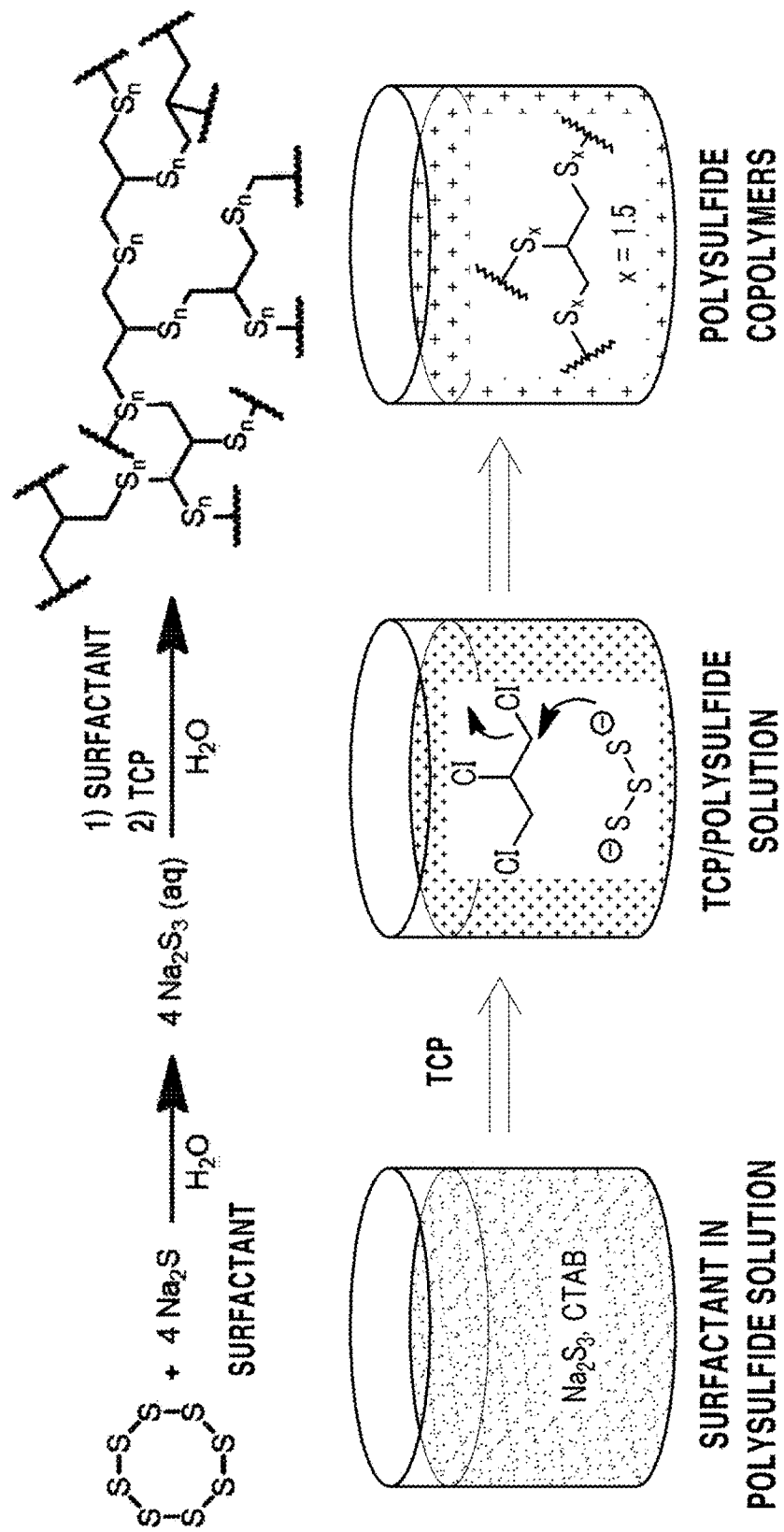
FIG. 1 is a schematic diagram illustrating a process of synthesizing a polysulfide copolymer particle in accordance with an embodiment of the present disclosure.

Hereinafter, embodiments and examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments of the present disclosure will be described in detail, but the present disclosure may not be limited thereto.

According to a first aspect of the present disclosure, there is provided a polysulfide copolymer particle having a sulfur content of about 65 wt % or more.

In an exemplary embodiment of the present disclosure, the polysulfide copolymer particle may be formed by copolymerization of a polysulfide with a polyfunctional monomer in the presence of a surfactant, but may not be limited thereto. In an exemplary embodiment of the present disclosure, the polysulfide can be supplied in the form of a polysulfide salt, and for example, the polysulfide salt may include an alkaline metal polysulfide or ammonium polysulfide, but may not be limited thereto.

A process of synthesizing a polysulfide copolymer particle in accordance with an exemplary embodiment of the present disclosure can be explained with reference to FIG. 1. FIG. 1 is a schematic diagram illustrating a process of synthesizing a polysulfide copolymer particle, and the polysulfide copolymer particle is formed by copolymerization of a polysulfide with a polyfunctional monomer in the presence of a surfactant. The polysulfide may be supplied in the form of a polysulfide salt represented by $X_2S_m$. For example, the polysulfide salt may include an alkaline metal polysulfide or ammonium polysulfide, but may not be limited thereto. Firstly, a sulfur-precursor solution containing the polysulfide salt is prepared. A surfactant is added to the prepared sulfur-precursor solution and stirred until the surfactant is completely dissolved. Herein, the surfactant may act as both a dispersing agent and a phase transfer catalyst and may include a cationic surfactant, but may not be limited thereto. After the surfactant is completely dissolved, a polyfunctional monomer is added to prepare a polysulfide copolymer particle by interfacial copolymerization.

In an exemplary embodiment of the present disclosure, the polyfunctional monomer has been conventionally known as reacting with a metal polysulfide to form a polymer, and can be appropriately used in the present disclosure. For example, the polyfunctional monomer may include 1,2-dichloroethane, 1,2-dibromoethane, 1,2-diiodoethane, 1,2,3-trichloropropane (TCP), 1,2,3-tribromopropane, 1,2,3-triiodopropane, bis-2-chloroethyl formal, bis-4-chlorobutyl ether, bis-4-chlorobutyl formal, or 1,3-dichloro-2-propanol, but may not be limited thereto. For example, the polyfunctional monomer may be used as including bis(4-chloromethyl)phenyl ether, bis(4-chloromacetyl)phenyl ether, 2,5'-di(chloromethyl)1,4-dioxane, or diethyleneglycol bis(chloroacetate), but may not be limited thereto. For example, the polyfunctional monomer may include a trifunctional, tetrafunctional, or pentafunctional organic compound of the above-exemplified monomers, and may be polymerized by combination with a polysulfide, but may not be limited thereto.

In an exemplary embodiment of the present disclosure, the polysulfide copolymer particle may have a size of from nanometer to micrometer, and may have a size of, for example, about 10 μm or less, but may not be limited thereto.

In an exemplary embodiment of the present disclosure, the polysulfide copolymer particle may have a size of from about 10 μm or less, from about 5 μm or less, from about 1 μm or less, from about 1 nm to about 10 μm, from about 10 nm to about 10 μm, from about 25 nm to about 10 μm, from about 50 nm to about 10 μm, from about 100 nm to about 10 μm, from about 25 nm to about 5 μm, from about 25 nm to about 4 μm, from about 25 nm to about 3 μm, from about 25 nm to about 2 μm, from about 25 nm to about 1 μm, from about 25 nm to about 500 nm, from about 25 nm to about 100 nm, from about 25 nm to about 50 nm, from about 50 nm to about 5 μm, from about 50 nm to about 4 μm, from about 50 nm to about 3 μm, from about 50 nm to about 2 μm, from about 50 nm to about 1 μm, from about 50 nm to about 500 nm, from about 80 nm to about 5 μm, from about 80 nm to about 4 μm, from about 80 nm to about 3 μm, from about 80 nm to about 2 μm, from about 80 nm to about 1.5 μm, from about 80 nm to about 1 μm, from about 100 nm to about 1 μm, from about 100 nm to about 800 nm, from about 100 nm to about 400 nm, from about 400 nm to about 1,000 nm, from about 400 nm to about 800 nm, from about 200 nm to about 800 nm, or from about 300 nm to about 800 nm, but may not be limited thereto.

In an exemplary embodiment of the present disclosure, the polysulfide copolymer particle may have a cross-linked polymer or a branched polymer form, but may not be limited thereto.

In an exemplary embodiment of the present disclosure, the surfactant may act as both a dispersing agent and a phase transfer catalyst, but may not be limited thereto.

In an exemplary embodiment of the present disclosure, the surfactant may include a cationic surfactant, but may not be limited thereto. For example, the cationic surfactant may be used without limitation as long as it is a tetravalent ammonium surfactant, and the cationic surfactant may include cetyltrimethyl ammonium bromide reaction (CTAB), Brij® C10, Brij® C20, Triton X-100, myristyltrimethylammonium bromide (MTAB), benzyl dodecyl dimethyl ammonium bromide (BDAB), hexadecyltrimethylammonium bromide, tetraheptylammonium bromide, cetyltrimethylammonium stearate, benzyltributylammonium chloride, benzyltrietylammonium bromide, benzyltrimethylammonium bromide, phenyltrimethylammonium bromide, phenyltrimethylammonium iodide, tetrabutylammonium bromide, tetrabutylammonium chloride, tetrabutylammonium hydrogen sulfate, tetrabutylammonium iodide, tetraethylammonium bromide, tetrabutylammonium fluoride, or tetrabutylammonium tetrafluoroborate, but may not be limited thereto.

In an exemplary embodiment of the present disclosure, it is possible to in-situ prepare a water-dispersible polysulfide copolymer particle having a sulfur content of 65 wt % or more or more than 65% through interfacial polymerization of a polyfunctional monomer and a polysulfide salt in water.

In an exemplary embodiment of the present disclosure, the polysulfide copolymer particle may have a sulfur content of, for example, about 65 wt % or more, about 70 wt % or more, about 75 wt % or more, about 80 wt % or more, about 85 wt % or more, about 90 wt % or more, or about 95 wt % or more, but may not be limited thereto.

In an exemplary embodiment of the present disclosure, the polysulfide copolymer particle may have a sulfur content of, for example, from about 65 wt % to about 100 wt %, from about 65 wt % to about 95 wt %, from about 65 wt % to about 90 wt %, from about 65 wt % to about 85 wt %, from about 65 wt % to about 80 wt %, from about 70 wt % to about 100 wt %, from about 70 wt % to about 95 wt %, from about 70 wt % to about 90 wt %, from about 70 wt % to about 85 wt %, or from about 70 wt % to about 80 wt %, but may not be limited thereto.

According to a second aspect of the present disclosure, there is provided a method of preparing a polysulfide copolymer particle, including: preparing a sulfur-precursor solution containing a polysulfide salt represented by the formula $X_2S_m$ wherein X is an alkali metal cation or ammonium cation and m is a number of from 1 to 10; and adding a surfactant and a polyfunctional monomer to the sulfur-precursor solution followed by polymerization reaction to obtain a polysulfide copolymer particle.

In an exemplary embodiment of the present disclosure, the alkali metal cation may be, for example, Na, Li, K, Rb, or Cs, but may not be limited thereto.

In an exemplary embodiment of the present disclosure, the polyfunctional monomer has been conventionally known as reacting with a metal polysulfide to form a polymer, and can be appropriately used in the present disclosure. For example, the polyfunctional monomer may include 1,2- dichloroethane, 1,2-dibromoethane, 1,2-diiodoethane, 1,2,3-trichloropropane (TCP), 1,2,3-tribromopropane, 1,2,3-triiodopropane, bis-2-chloroethyl formal, bis-4-chlorobutyl ether, bis-4-chlorobutyl formal, or 1,3-dichloro-2-propanol, but may not be limited thereto. For example, the polyfunctional monomer may be used as including bis(4-chloromethyl)phenyl ether, bis(4-chloromacetyl)phenyl ether, 2,5'-di(chloromethyl)1,4-dioxane, or diethyleneglycol bis(chloroacetate), but may not be limited thereto. For example, the polyfunctional monomer may include a trifunctional, tetrafunctional, or pentafunctional organic compound of the above-exemplified monomers, and may be polymerized by combination with a polysulfide, but may not be limited thereto.

In an exemplary embodiment of the present disclosure, for example, a molar ratio of the polysulfide salt to the surfactant may be about 1:0.1 to 500, but may not be limited thereto. For example, a molar ratio of the polysulfide salt to the surfactant may be about 1:0.1 to 500, about 1:0.1 to 400, about 1:0.1 to 300, about 1:0.1 to 200, about 1:0.1 to 100, about 1:0.1 to 50, or about 1:0.1 to 10, but may not be limited thereto.

In an exemplary embodiment of the present disclosure, the surfactant may have a concentration equal to or higher than that of the sulfur-precursor, but may not be limited thereto. For example, a molar ratio of the polysulfide salt to the surfactant may be about 1:1 to 500, about 1:1 to 400, about 1:1 to 300, about 1:1 to 200, about 1:1 to 100, about 1:1 to 50, or about 1:1 to 10, but may not be limited thereto.

In an exemplary embodiment of the present disclosure, a solvent in the sulfur-precursor solution may include a member selected from the group consisting of water, methanol, ethanol, propanol, isopropanol, dimethylformamide, dimethylacetamide, N-methyl-2-pyrrolidone, N-methyl-2-piperidone, N-methylmorpholine, N-methylmorpholine-N-oxide, dimethylsulfoxide, dimethylsulfone, sulforane, 1,4-dioxane, and combinations thereof, but may not be limited thereto.

In an exemplary embodiment of the present disclosure, the polysulfide copolymer particle may be prepared in an inert atmosphere such as a nitrogen atmosphere, but may not be limited thereto.

In an exemplary embodiment of the present disclosure, the polysulfide copolymer particle may be prepared at a temperature of from about 10° C. to about 80° C., but may not be limited thereto. For example, the polysulfide copolymer particle may be prepared at a temperature of from about 10° C. to about 80° C., from about 10° C. to about 70° C., from about 10° C. to about 60° C., from about 10° C. to about 50° C., from about 10° C. to about 40° C., from about 10° C. to about 30° C., from room temperature to about 80° C., from room temperature to about 70° C., from room temperature to about 60° C., from room temperature to about 50° C., from room temperature to about 40° C., or from room temperature to about 30° C., but may not be limited thereto.

In an exemplary embodiment of the present disclosure, the surfactant may act as both a dispersing agent and a phase transfer catalyst, but may not be limited thereto.

In an exemplary embodiment of the present disclosure, the surfactant may include a cationic surfactant, but may not be limited thereto. For example, the cationic surfactant may be used without limitation as long as it is a tetravalent ammonium surfactant, and the cationic surfactant may include cetyltrimethyl ammonium bromide reaction (CTAB), Brij® C10, Brij® C20, Triton X-100, myristyltrimethylammonium bromide (MTAB), benzyl dodecyldimethylammonium bromide (BDAB), hexadecyltrimethylammonium bromide, tetraheptylammonium bromide, cetyltrimethylammonium stearate, benzyltributylammonium chloride, benzyltrietylammonium bromide, benzyltrimethylammonium bromide, phenyltrimethylammonium bromide, phenyltrimethylammonium iodide, tetrabutylammonium bromide, tetrabutylammonium chloride, tetrabutylammonium hydrogen sulfate, tetrabutylammonium iodide, tetraethylammonium bromide, tetrabutylammonium fluoride, or tetrabutylammonium tetrafluoroborate, but may not be limited thereto.

In an exemplary embodiment of the present disclosure, the polysulfide copolymer particle may have a size of from nanometer to micrometer, and may have a size of, for example, about 10 μm or less, but may not be limited thereto.

In an exemplary embodiment of the present disclosure, the polysulfide copolymer particle may have a size of about 10 μm or less, about 5 μm or less, about 1 μm or less, from about 1 nm to about 10 μm, from about 10 nm to about 10 μm, from about 25 nm to about 10 μm, from about 50 nm to about 10 μm, from about 100 nm to about 10 μm, from about 25 nm to about 5 μm, from about 25 nm to about 4 μm, from about 25 nm to about 3 μm, from about 25 nm to about 2 μm, from about 25 nm to about 1 μm, from about 25 nm to about 500 nm, from about 25 nm to about 100 nm, from about 25 nm to about 50 nm, from about 50 nm to about 5 μm, from about 50 nm to about 4 μm, from about 50 nm to about 3 μm, from about 50 nm to about 2 μm, from about 50 nm to about 1 μm, from about 50 nm to about 500 nm, from about 80 nm to about 5 μm, from about 80 nm to about 4 μm, from about 80 nm to about 3 μm, from about 80 nm to about 2 μm, from about 80 nm to about 1.5 μm, from about 80 nm to about 1 μm, from about 100 nm to about 1 μm, from about 100 nm to about 800 nm, from about 100 nm to about 400 nm, from about 400 nm to about 1,000 nm, from about 400 nm to about 800 nm, from about 200 nm to about 800 nm, or from about 300 nm to about 800 nm, but may not be limited thereto.

In an exemplary embodiment of the present disclosure, the polysulfide copolymer particle may have a sulfur content of about 65 wt % or more, but may not be limited thereto. For example, the polysulfide copolymer particle may have a sulfur content of about 65 wt % or more, about 70 wt % or more, about 75 wt % or more, about 80 wt % or more, about 85 wt % or more, about 90 wt % or more, or about 95 wt % or more, but may not be limited thereto.

In an exemplary embodiment of the present disclosure, the polysulfide copolymer particle may have a sulfur content of, for example, from about 65 wt % to about 100 wt %, from about 65 wt % to about 95 wt %, from about 65 wt % to about 90 wt %, from about 65 wt % to about 85 wt %, from about 65 wt % to about 80 wt %, from about 70 wt % to about 100 wt %, from about 70 wt % to about 95 wt %, from about 70 wt % to about 90 wt %, from about 70 wt % to about 85 wt %, or from about 70 wt % to about 80 wt %, but may not be limited thereto.

Hereinafter, the present disclosure will be explained in more detail with reference to Examples. However, the following Examples are illustrative only for better understanding of the present disclosure but do not limit the present disclosure.

EXAMPLES

Materials and Methods

All polymerization reactions were performed under a nitrogen atmosphere using a standard Schlenk technology.

Distilled water was deaerated by nitrogen bubbling for at least one hour before use. Sodium trisulfide and sodium tetrasulfide (aqueous or non-aqueous type), TCP (1,2,3-trichloropropane, 99%), cetyltrimethyl ammonium bromide (CTAB, 98%), and tetrabutylammonium bromide (TBAB, 98%) were purchased from Sigma-Aldrich. Sulfur (sublimed, 99.5%) was purchased from Samchun Chemical. A DLS measurement was performed using deionized water as a solvent in an ELSZ-1000 (Otsuka Electronics). An elemental analysis was conducted with a Flash 2000 CHNS/O analyzer (Thermo Scientific). Scanning electron microscope (SEM) images were obtained by a JEOL JSM-6701F scanning electron microscope.

Example 1: Preparation of Sulfur-Precursor Solution 1-1: Preparation of Sodium Trisulfide A sodium trisulfide (stock) solution as a sulfur-precursor solution containing a polysulfide salt was prepared by dissolving sulfur (641 mg, 20 mmol) in a solution of $Na_2S$ (780 mg, 10 mmol) in 8 mL of water within a septum-sealed volumetric flask under nitrogen and then adding water thereto until a volume of the solution reached 10 mL.

1-2: Preparation of Sodium Tetrasulfide

A sodium tetrasulfide (stock) solution as a sulfur-precursor solution containing a polysulfide salt was prepared by dissolving sulfur (961 mg, 30 mmol) in a solution of $Na_2S$ (780 mg, 10 mmol) in 8 mL of water within a septum-sealed volumetric flask under nitrogen and then adding water thereto until a volume of the solution reached 10 mL.

Example 2: Synthesis of Polysulfide Copolymer Particle 2-1: Use of 0.1 mL of Sodium Trisulfide, 21.3 μL of TCP, and 73 mg of CTAB In order to prepare a polysulfide copolymer particle, a 20-mL scintillation vial including a stirring bar and CTAB (73 mg, 0.20 mmol) was filled with distilled and deaerated water (9.90 mL) under nitrogen. Upon complete dissolution of the surfactant, the sodium trisulfide solution (0.10 mL, 0.10 mmol) prepared in the above-described Example was dropwisely added through a syringe under nitrogen. The vial was put in a heating block preheated to 30° C. and stirred for 30 minutes at 600 rpm. Then, 21.3 μL of 0.20 mmol TCP was added thereto. A pale-yellow reaction mixture turned into a cloudy white dispersion within four hours. The reaction was carried out with further stirring for 8 hours before DLS and SEM analysis.

Figure 2:
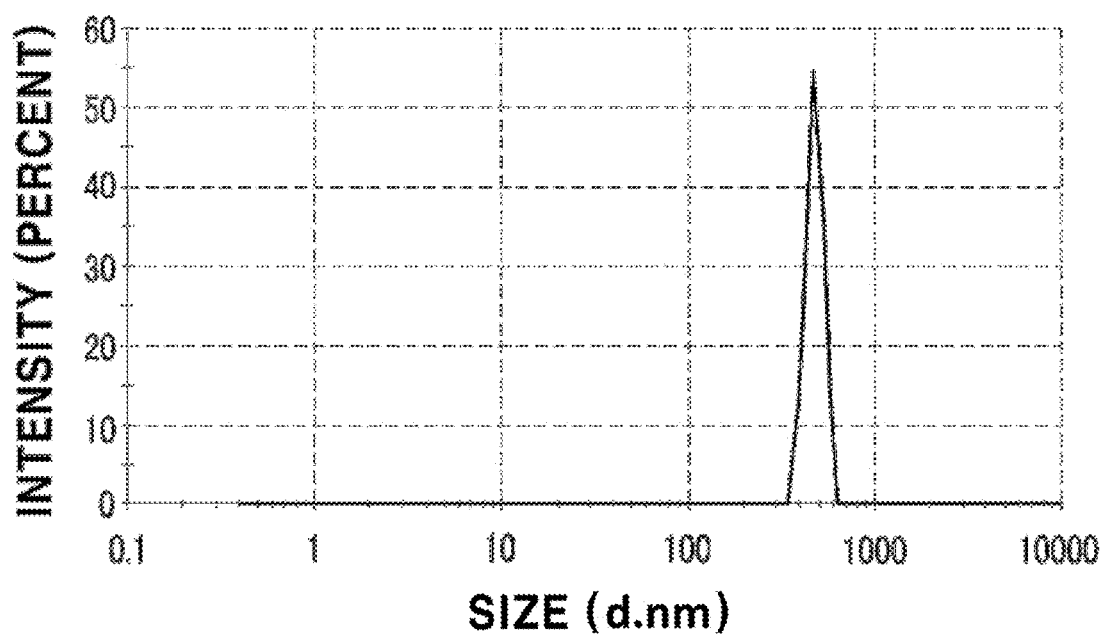
FIG. 2 is a graph showing a dynamic light scattering (DLS) curve of a polysulfide copolymer particle prepared in accordance with Example 2-2 of the present disclosure.
Figure 3:
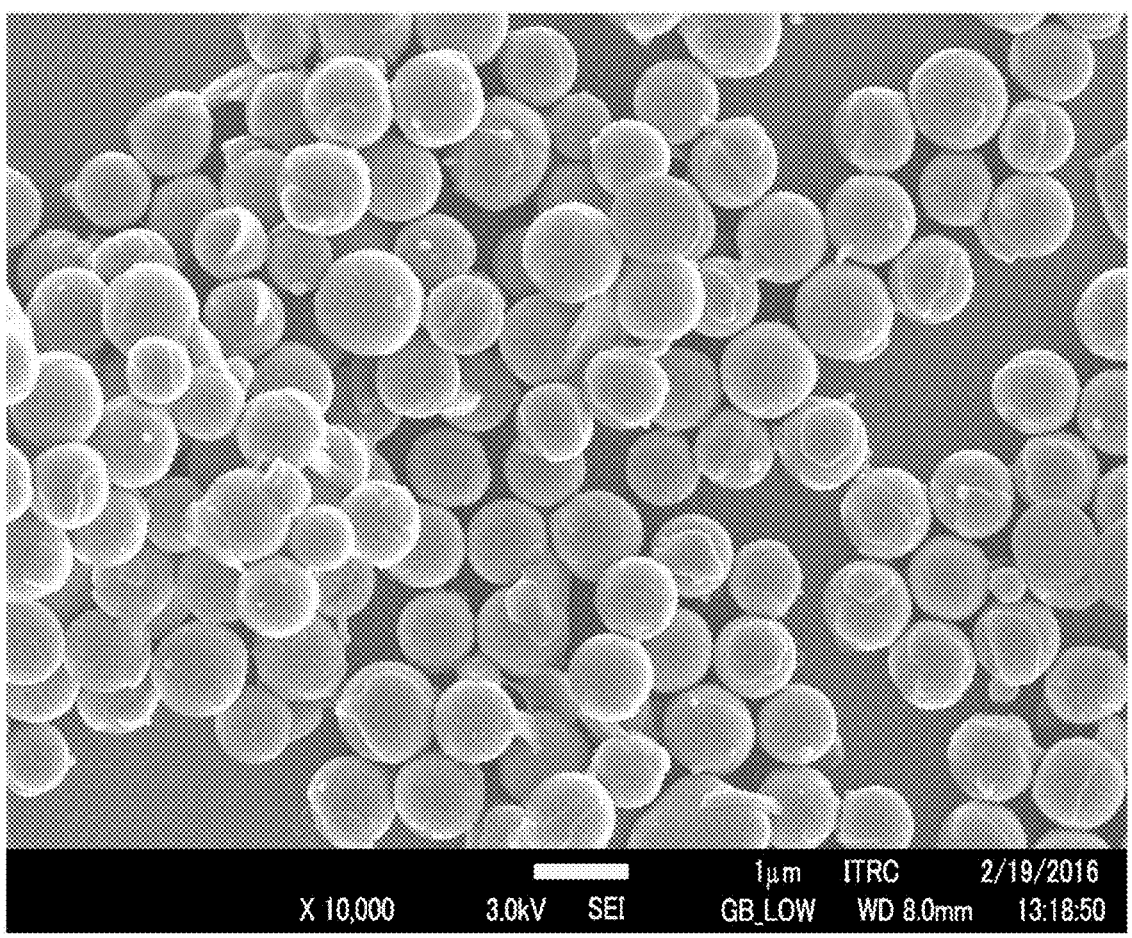
FIG. 3 is an SEM image of a polysulfide copolymer particle prepared in accordance with Example 2-2 of the present disclosure.

2-2: Use of 0.1 mL of Sodium Tetrasulfide, 21.3 μL of TCP, 121 μL of Triton X-100, and 323.3 mg of TBAB Unlike Example 2-1 in which CTAB capable of acting as both a surfactant and a phase transfer catalyst was used, a polysulfide copolymer particle was synthesized using a combination of a surfactant (Triton X-100) which cannot act as a phase transfer catalyst and a phase transfer catalyst (TBAB) which cannot act as a surfactant. Specifically, a 20-mL scintillation vial including a stirring bar was filled with distilled and deaerated water (9.90 mL) under nitrogen. Then, TCP (21.3 μL, 0.20 mmol) was injected thereto, and 121 μL of 0.20 mmol Triton X-100 as a surfactant and 32.3 mg of 0.10 mmol TBAB as a phase transfer catalyst were added thereto and dissolved. After the surfactant and the phase transfer catalyst were dissolved, a sodium tetrasulfide solution (0.10 mL, 0.10 mmol) was dropwise added through a syringe under nitrogen. The vial was put in a heating block preheated to 30° C. and stirred for 1 day at 600 rpm. A pale-yellow reaction mixture with red precipitates which were generated and gradually disappeared turned into a slightly yellowish cloudy white dispersion. 24 hours later, the reaction product was washed twice by redispersion-centrifugation in water, and then, DLS and SEM analysis was conducted. The result of DLS of the prepared polysulfide copolymer particle was as shown in the following Table 1 and FIG. 2, and an SEM image of the prepared polysulfide copolymer particle was as shown in FIG. 3.

TABLE 1

|  | SIZE (d · nm) | INTENSITY (%) | STANDARD DEVIATION (d · nm) |
|---|---|---|---|
| PEAK 1 | 471.2 | 100.0 | 45.06 |
| PEAK 2 | 0.000 | 0.000 | 0.000 |
| PEAK 3 | 0.000 | 0.000 | 0.000 |

Figure 4:
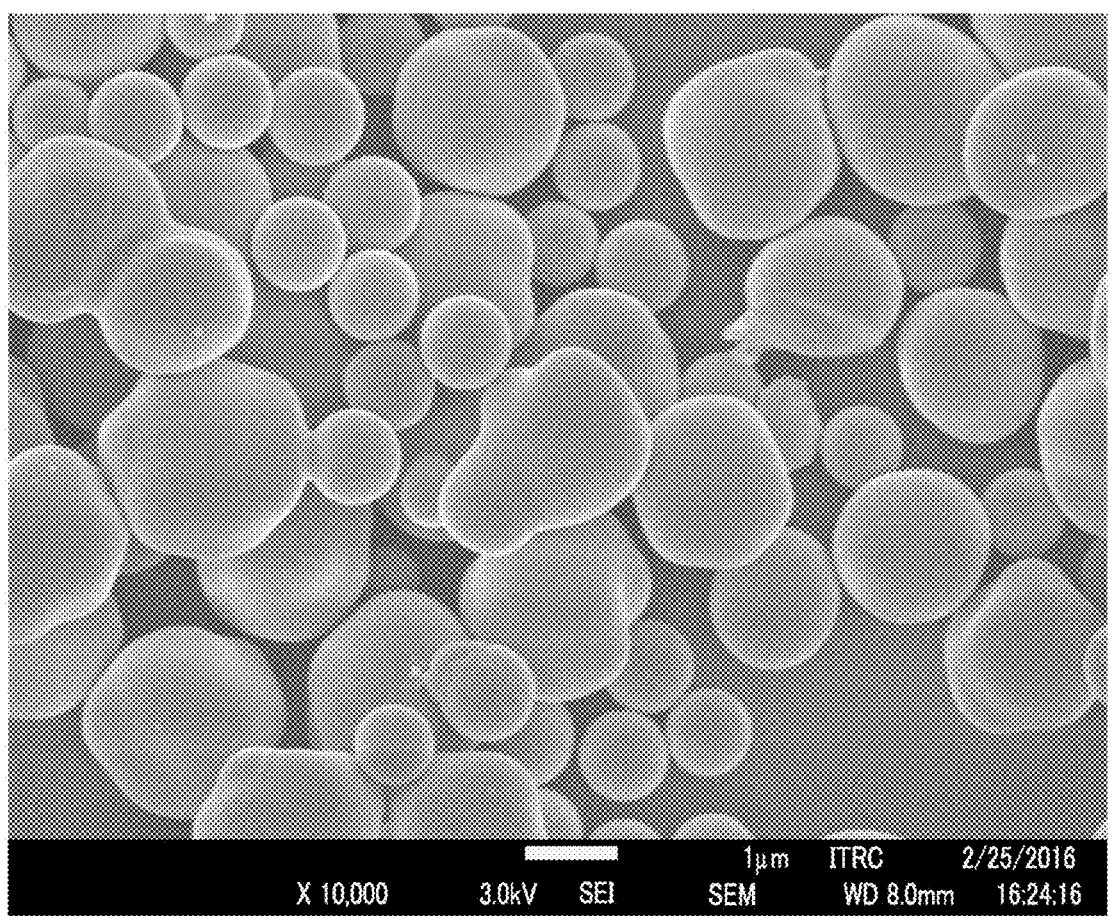
FIG. 4 is an SEM image of a polysulfide copolymer particle prepared in accordance with Example 2-3 of the present disclosure.

2-3: Use of 0.5 mL of Sodium Tetrasulfide, 106 μL of TCP, 605 μL of Triton X-100, and 161.5 mg of TBAB In addition, another polysulfide copolymer particle was prepared by adjusting the amount of a solute except a solvent in order to increase a sulfur content. Distilled and deaerated water (9.50 mL), TCP (106 μL, 1.00 mmol), Triton X-100 (605 μL, 1.00 mmol), TBAB (161.5 mg, 0.50 mmol), and a sodium tetrasulfide solution (0.5 mL, 0.5 mmol) were dropwise added in sequence into a scintillation vial under the same conditions as in Example 2-2, and then reacted in the same environment for 24 hours. An SEM image of the prepared polysulfide copolymer particle was as shown in FIG. 4.

Figure 5:
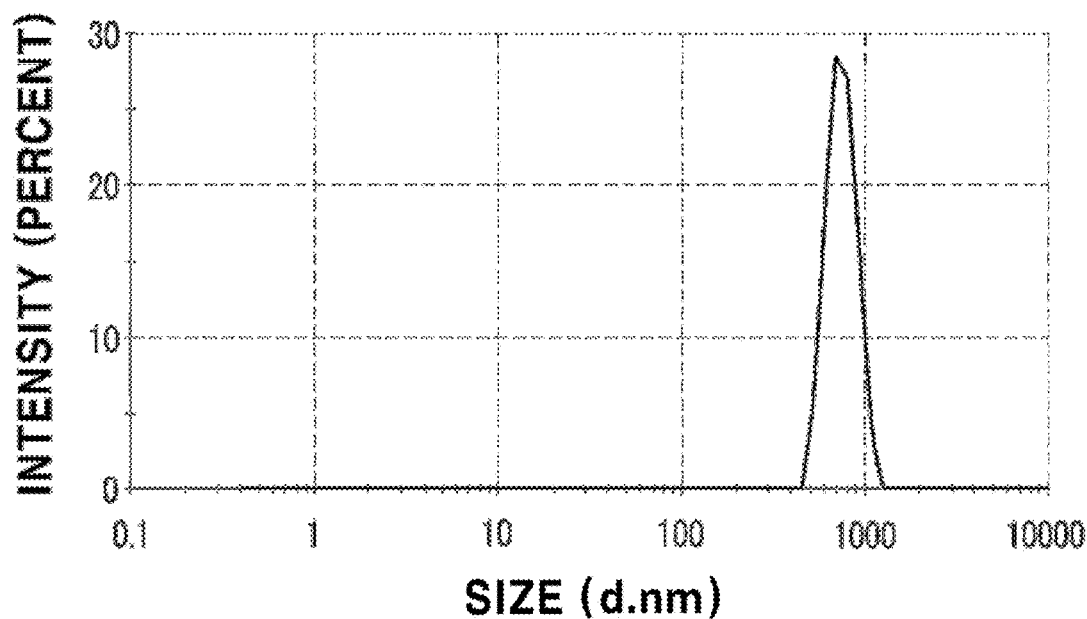
FIG. 5 is a graph showing a DLS curve of a polysulfide copolymer particle prepared in accordance with Example 2-4 of the present disclosure.

2-4: Use of 0.5 mL of Sodium Tetrasulfide, 106 μL of TCP, 1512.5 μL of Triton X-100, and 161.5 mg of TBAB A polysulfide copolymer particle was prepared in the same manner as in Example 2-3 except that the amount of the surfactant was increased. Distilled and deaerated water (9.50 mL), TCP (106 μL, 1.00 mmol), Triton X-100 (1512.5 μL, 2.50 mmol), TBAB (161.5 mg, 0.50 mmol), and a sodium tetrasulfide solution (0.5 mL, 0.5 mmol) were dropwise added in sequence into a scintillation vial under the same conditions, and then reacted in the same environment for 24 hours. The result of DLS of the prepared polysulfide copolymer particle was as shown in the following Table 2 and FIG. 5.

TABLE 2

|  | SIZE (d · nm) | INTENSITY (%) | STANDARD DEVIATION (d · nm) |
|---|---|---|---|
| PEAK 1 | 767.8 | 100.0 | 139.7 |
| PEAK 2 | 0.000 | 0.000 | 0.000 |
| PEAK 3 | 0.000 | 0.000 | 0.000 |

Figure 6:
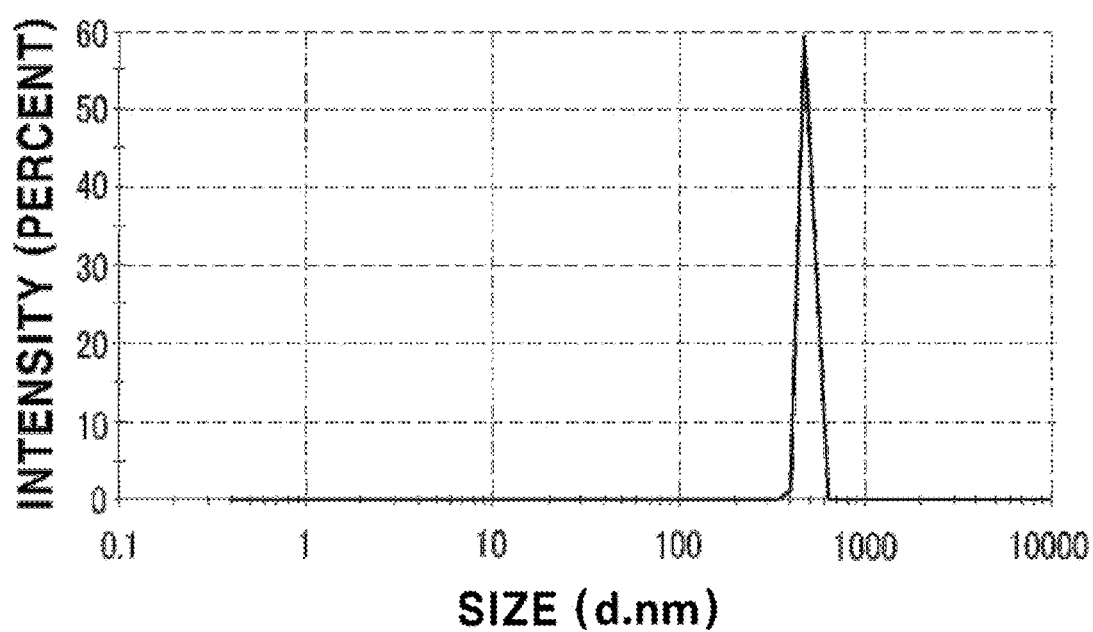
FIG. 6 is a graph showing a DLS curve of a polysulfide copolymer particle prepared in accordance with Example 2-5 of the present disclosure.
Figure 7A:
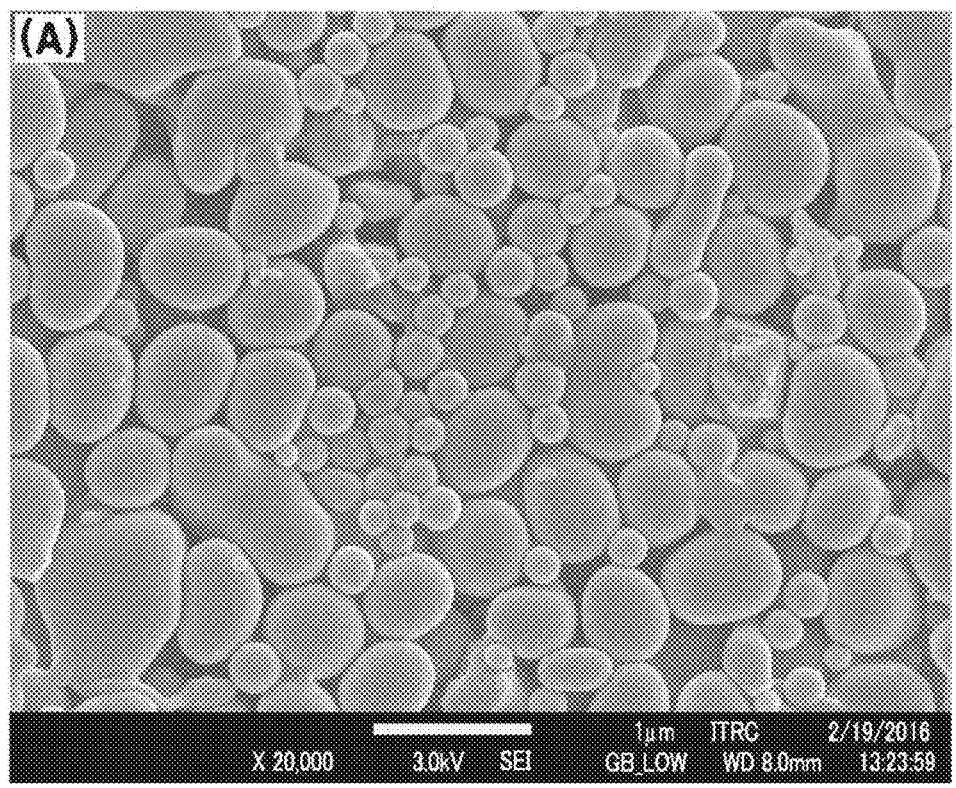
FIG. 7A and FIG. 7B are SEM images of a polysulfide copolymer particle prepared in accordance with Example 2-5 of the present disclosure.
Figure 7B:
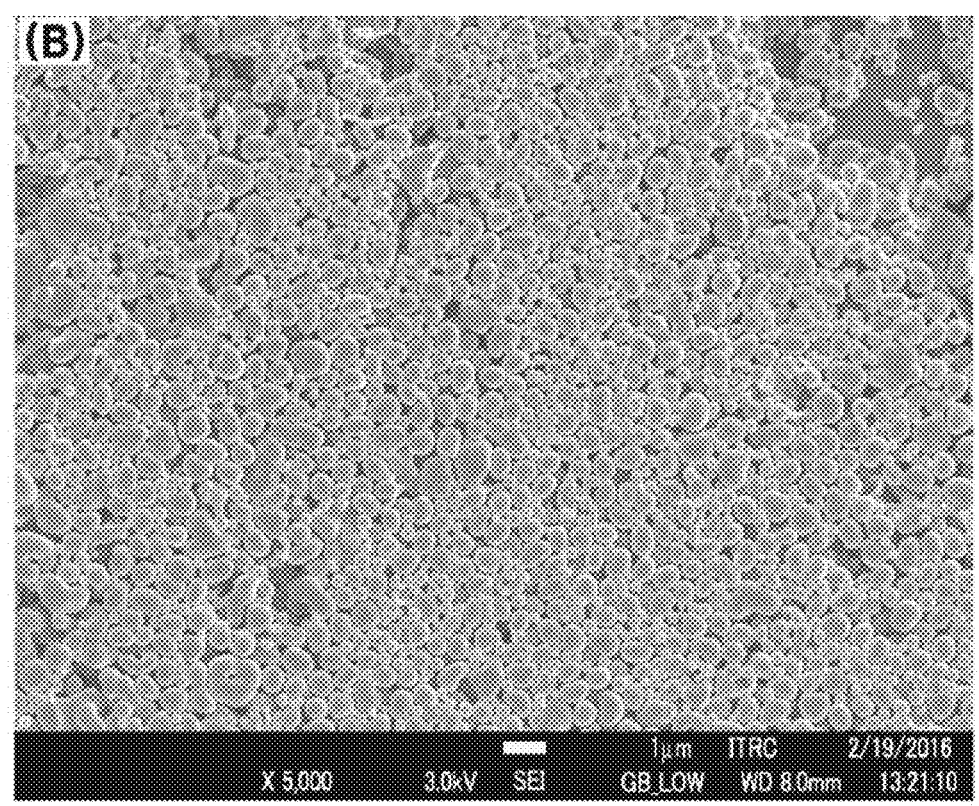

2-5: Use of 0.5 mL of Sodium Tetrasulfide, 106 μL of TCP, 605 μL of Triton X-100, and 64.6 mg of TBAB A polysulfide copolymer particle was prepared in the same manner as in Example 2-3 except that the amount of TBAB acting as a phase transfer catalyst was decreased. Distilled and deaerated water (9.50 mL), TCP (106 μL, 1.00 mmol), Triton X-100 (1512.5 μL, 2.50 mmol), TBAB (64.6 mg, 0.2 mmol), and a polysulfide stock solution (0.5 mL, 0.5 mmol) were dropwise added in sequence into a scintillation vial under the same conditions, and then reacted in the same environment for 24 hours. The result of DLS of the prepared polysulfide copolymer particle was as shown in the following Table 3 and FIG. 6, and an SEM image of the prepared polysulfide copolymer particle was as shown in FIGS. 7A and 7B. FIG. 7A is a 20,000 magnification SEM image of the prepared polysulfide copolymer particle and FIG. 7B is a 5,000 magnification SEM image of the prepared polysulfide copolymer particle.

TABLE 3

|  | SIZE (d · nm) | INTENSITY (%) | STANDARD DEVIATION (d · nm) |
|---|---|---|---|
| PEAK 1 | 492.9 | 100.0 | 63.27 |
| PEAK 2 | 0.000 | 0.000 | 0.000 |
| PEAK 3 | 0.000 | 0.000 | 0.000 |

If only the amount of TBAB acting as a phase transfer catalyst is increased, a size of the prepared polysulfide copolymer particle is not significantly affected. However, if the amounts of Triton X-100 acting as a surfactant and TBAB acting as a phase transfer catalyst are increased at the same time, a size of the prepared polysulfide copolymer particle is increased. This can be confirmed from the result that a size of a polysulfide copolymer particle prepared when the amounts of Triton X-100 and TBAB are increased by about 5 times is increased by about 160% from about 470 nm to about 760 nm.

Further, if the amounts of Triton X-100 and TBAB are increased at the same time, the distribution of a size of the prepared polysulfide copolymer particle is expanded and the prepared particle is obtained in various shapes far from a spherical shape. This result means that even if a triton-based material which is a neutral polymer surfactant is used instead of CTAB which can act as both a surfactant and a phase transfer catalyst, a polysulfide copolymer particle can be synthesized.

Example 3: Synthesis of Polysulfide Particle Using Surfactant Different in Properties and Structure A uniform and stable polysulfide particle having a size of 1 micrometer or more was prepared using each of Brij C10® (Sigma Aldrich), Brij C20® (Sigma Aldrich), and Triton X-100 (Sigma Aldrich) as a surfactant different in properties and structure (Scheme 1) from CTAB (cetyltrimethyl ammonium bromide) used in the existing process for preparing a particle.

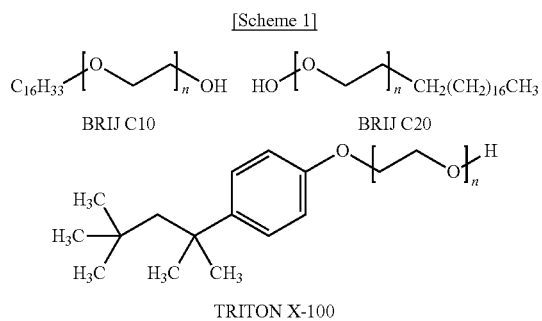

[Scheme 1]

As for particles prepared under the synthesis conditions of PS rank=4, [surfactant]=30 mM, 50 mM, 70 mM, and [PTC]=30 mM, dynamic light scattering (DLS) data were measured as shown in the following Table 4.

TABLE 4

| Sample Name | Surfactant | Z-Average (nm) | PdI |
|---|---|---|---|
| rk4_BrijC10 | BrijC10 | 1274 | 0.512 |
| rk4_BrijC20 | BrijC20 | 870.5 | 0.389 |
| rk4_TritonX-100(30 mM) | TritonX-100 | 1614 | 0.568 |
| rk4_TritonX-100(50 mM) | TritonX-100 | 2697 | 0.846 |
| rk4_TritonX-100(70 mM) | TritonX-100 | 1091 | 0.56 |

Figure 8A:
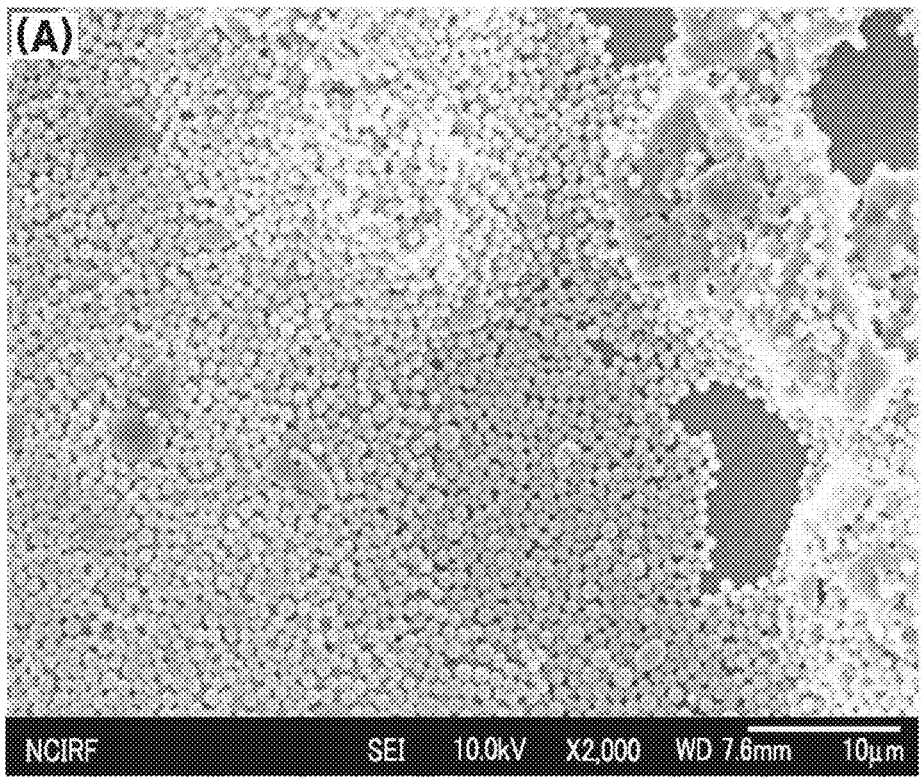
FIG. 8A and FIG. 8B are SEM images of a polysulfide copolymer particle prepared using Brij® C10 as a surfactant in accordance with Example 3 of the present disclosure.
Figure 8B:
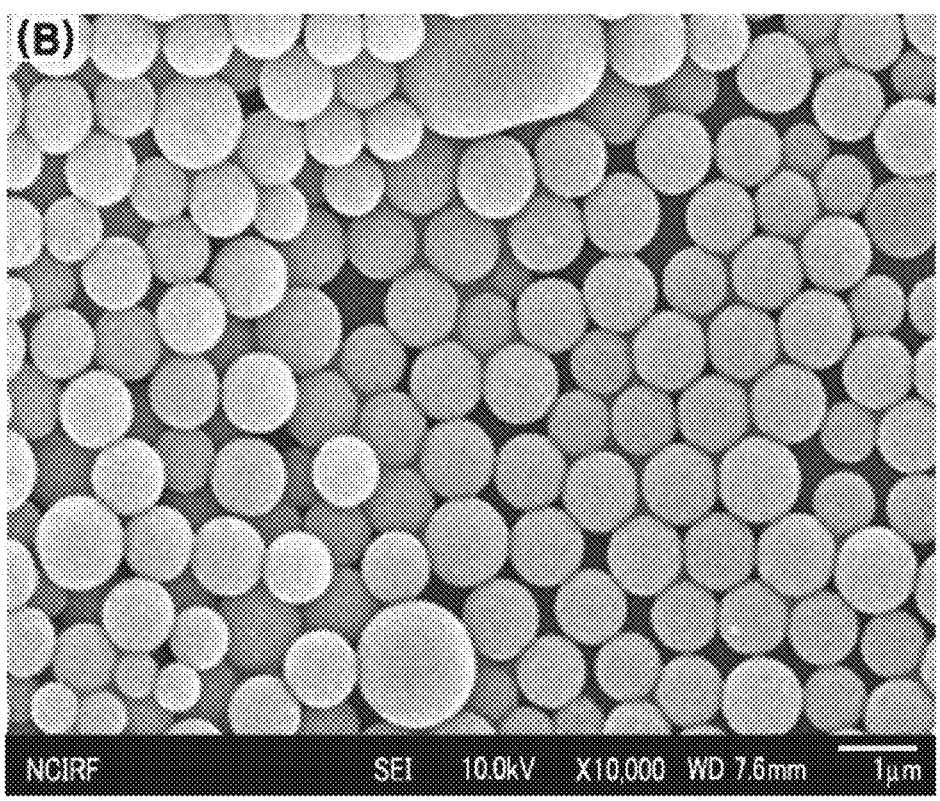
Figure 9A:
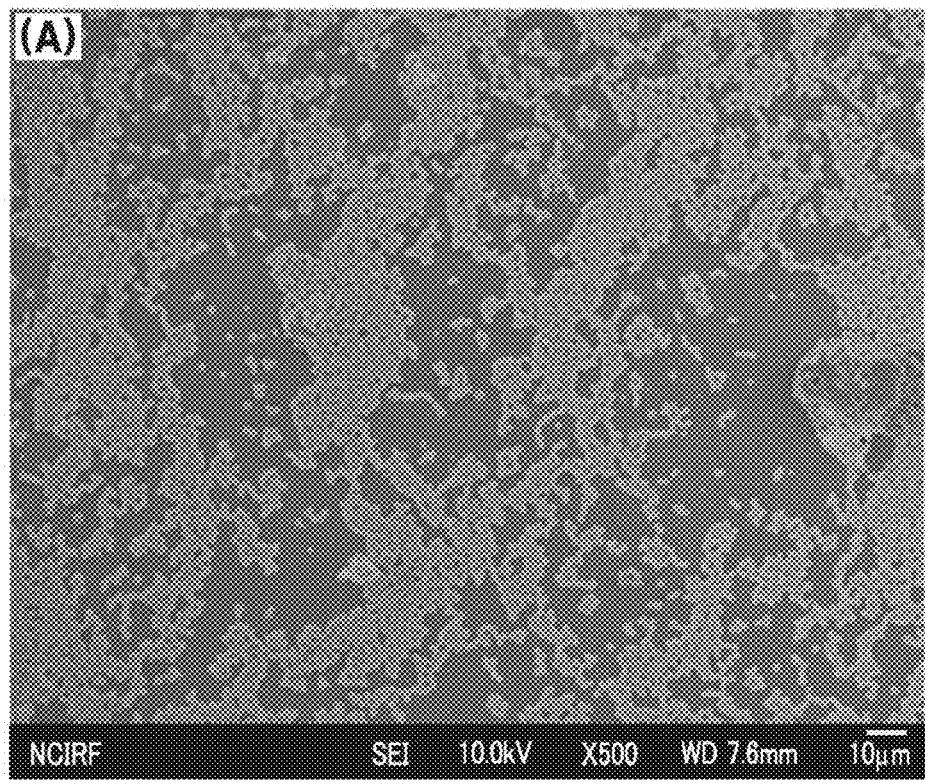
FIG. 9A and FIG. 9B are SEM images of a polysulfide copolymer particle prepared using Brij® C20 as a surfactant in accordance with Example 3 of the present disclosure.
Figure 9B:
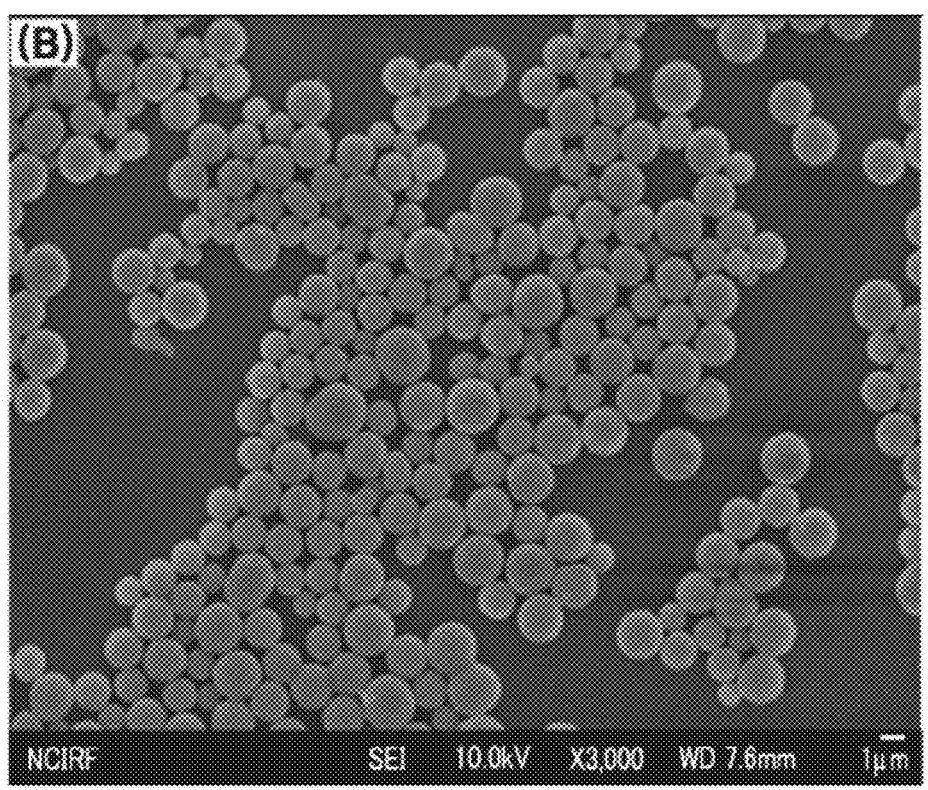
Figure 10A:
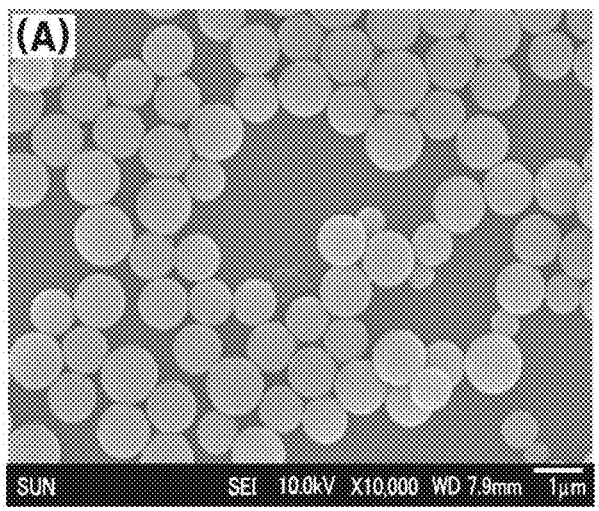
FIG. 10A to FIG. 10C are SEM images of a polysulfide copolymer particle prepared using Triton X-100 as a surfactant in accordance with Example 3 of the present disclosure.
Figure 10B:
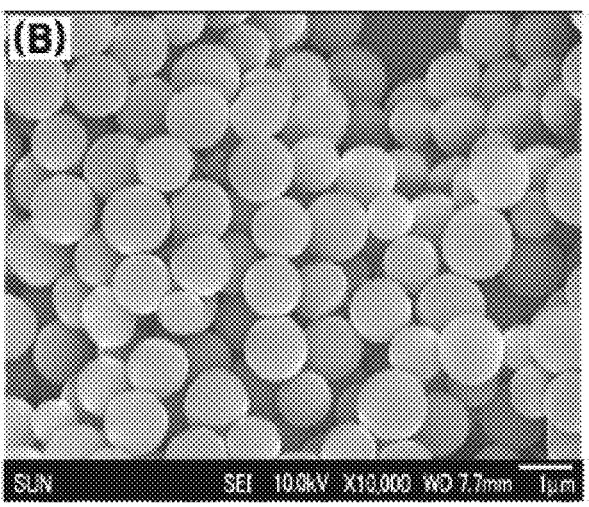
Figure 10C:
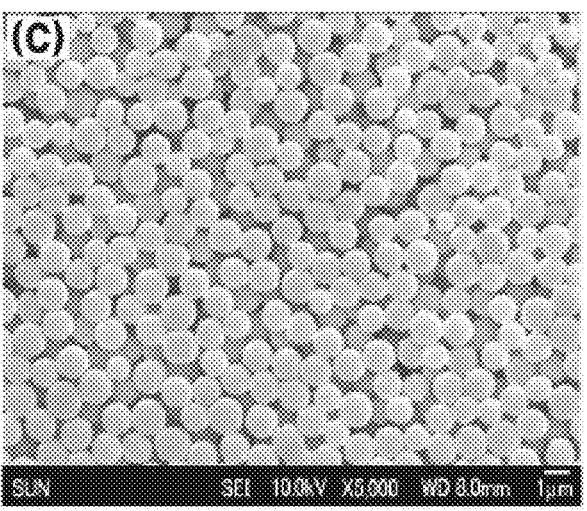

Further, an SEM measurement was performed to check a shape of the prepared particle. The samples were particles prepared under the synthesis conditions of PS rank=4, [surfactant]=30 mM, 50 mM, 70 mM, and [PTC]=30 mM. As a result of checking SEM images, it was observed that uniform particles having a size of 1 μm or more were formed (FIGS. 8A, 8B, 9A, 9B, 10A, 10B, and 10C). FIG. 8A is a 2,000 magnification SEM image of a particle prepared using Brij® C10 and FIG. 8B is a 10,000 magnification SEM image of a particle prepared using Brij® C10. FIG. 9A is a 500 magnification SEM image of a particle prepared using Brij® C20, and FIG. 9B is a 3,000 magnification SEM image of a particle prepared using Brij® C20. FIGS. 10A and 10B are 10,000 magnification SEM images of particles prepared using Triton X-100 and FIG. 10C is a 5,000 magnification SEM image of particles prepared using Triton X-100. As shown in FIGS. 8A to 10C, a particle prepared using Brij® C10 was measured to have a size of 0.9 μm, a particle prepared using Brij® C20 was measured to have a size of 2.1 μm, and particles prepared using Triton X-100 were measured to have sizes of 1.1 μm, 1.3 μm, and 1.1 μm, respectively. According to the result, it can be seen that a size of the prepared particle is controlled by the kind of a surfactant.

Example 4: Analysis of Polysulfide Copolymer Particle

A polysulfide copolymer particle sample for DLS analysis was prepared by obtaining a 100-μL aliquot from the reaction mixture and then diluting the 100-μL aliquot to 10 mL. In order to prepare a sample for SEM image, the solid reaction mixture was isolated by centrifugation and washed twice by redispersion-centrifugation in water. Then, the obtained solid was dispersed in water and drop-casted on a piranha-cleaned silicon wafer and then dried in a vacuum.

In the present Example, a water-dispersible polysulfide copolymer particle (NP) having a sulfur content of more than 75 wt % was synthesized using a novel synthetic modification in preparation of an elastomer polysulfide developed by Tobolosky et al. The synthesis of the polysulfide copolymer particle includes simple interfacial polymerization between aqueous sodium polysulfide generated by decomposition of elemental sulfur and 1,2,3-trichloropropane (TCP). Modification of the interfacial polymerization has been known as obtaining condensed rubber, but it was found that when it was performed in the presence of a cationic surfactant capable of acting as both a dispersing agent and a phase transfer catalyst in very diluted conditions, a polysulfide copolymer particle could be obtained. Further, a size of the particle could be controlled by varying a concentration of the phase transfer catalyst. An elemental analysis of the particle shows a sulfur content in agreement with a rank of a polysulfide solution, which implies that the above-described method of preparation can be further used for preparing a sulfur-containing polysulfide copolymer particle having a desired sulfur content.

Figure 11A:
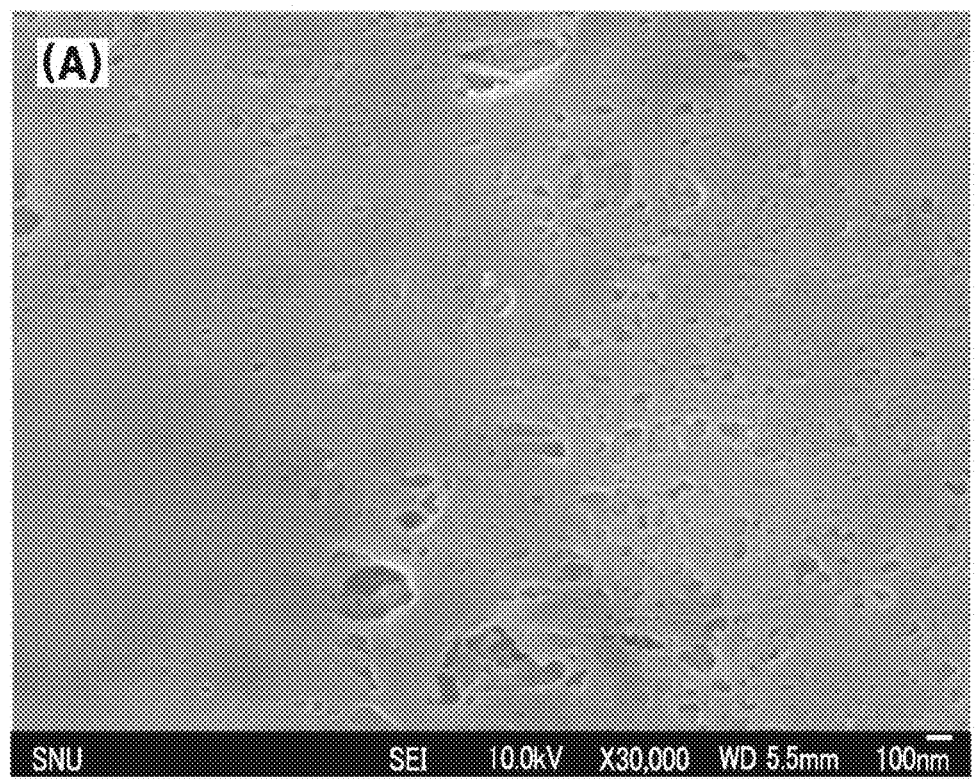
FIG. 11A to FIG. 11D provide scanning electron microscope (SEM) images of polysulfide copolymer particles obtained without a surfactant [FIG. 11A] and in the presence of sodium dodecyl sulfate (SDS) [FIG. 11B], respectively, an SEM image of a polysulfide copolymer particle obtained in the presence of cetyltrimethyl ammonium bromide (CTAB) [FIG. 11C], and a graph showing DLS curve of the polysulfide copolymer particle obtained in the presence of CTAB [FIG. 11D] in accordance with an example of the present disclosure.

An interfacial polycondensation between the aqueous sodium polysulfide and TCP was first performed without the presence of a surfactant, and the properties of the obtained polysulfide elastomer were analyzed. When a sodium trisulfide-diluted solution (10 mM) was processed using TCP at 30° C. with powerful stirring, a yellow color as a feature of the polysulfide gradually disappeared over 3 days and a clean solution including a large white solid agglomerate could be obtained. An elemental analysis of the solid showed a sulfur content of 77.6% (19.3% carbon and 3.0% hydrogen) corresponding to a chemical structure of a cross-linked polymer when n of the formula $X_2S_m$ is 3. An SEM image of the obtained solid showed featureless agglomerated spheres [FIG. 11A].

Figure 11B:
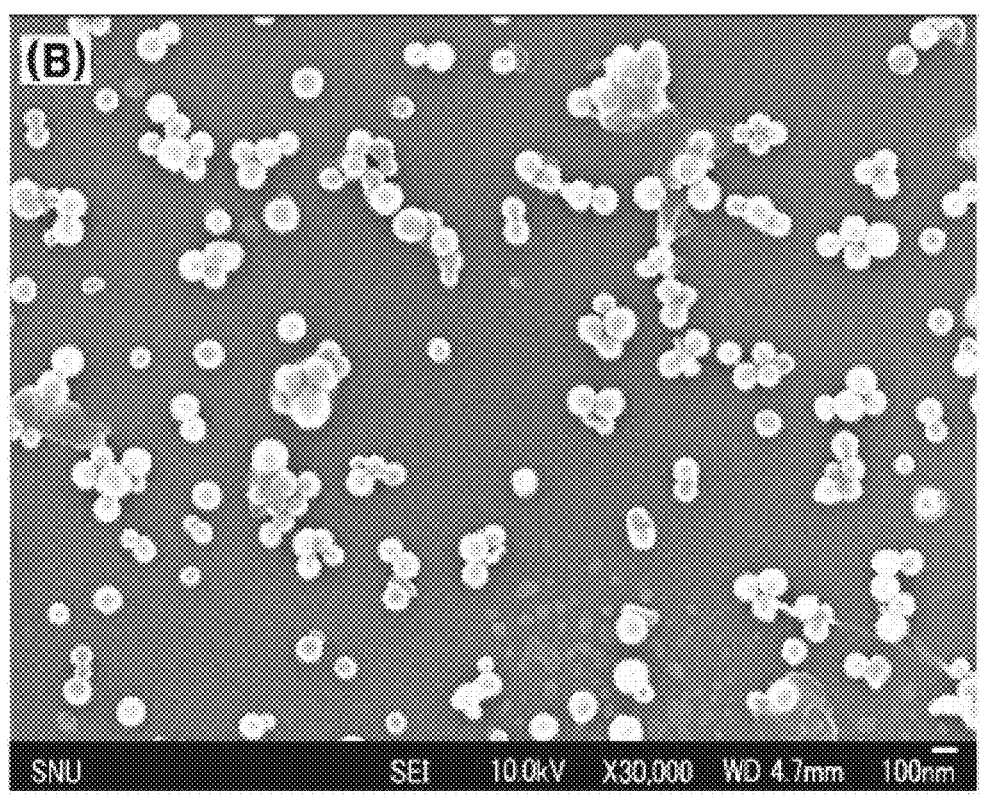
Figure 11C:
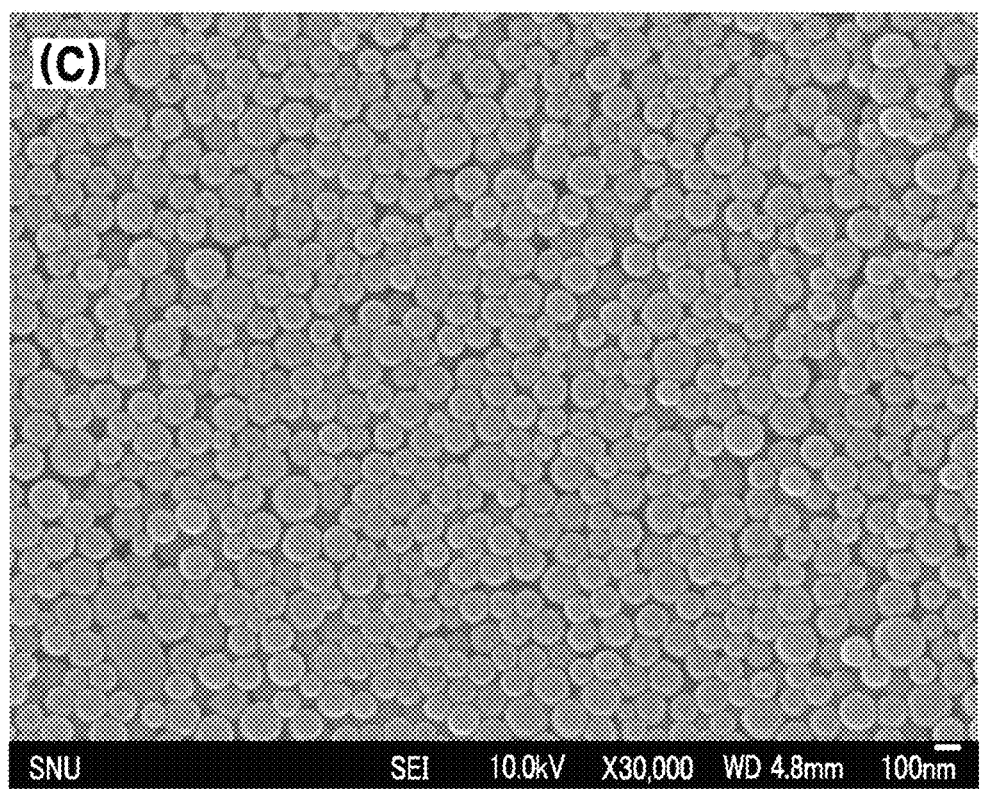
Figure 11D:
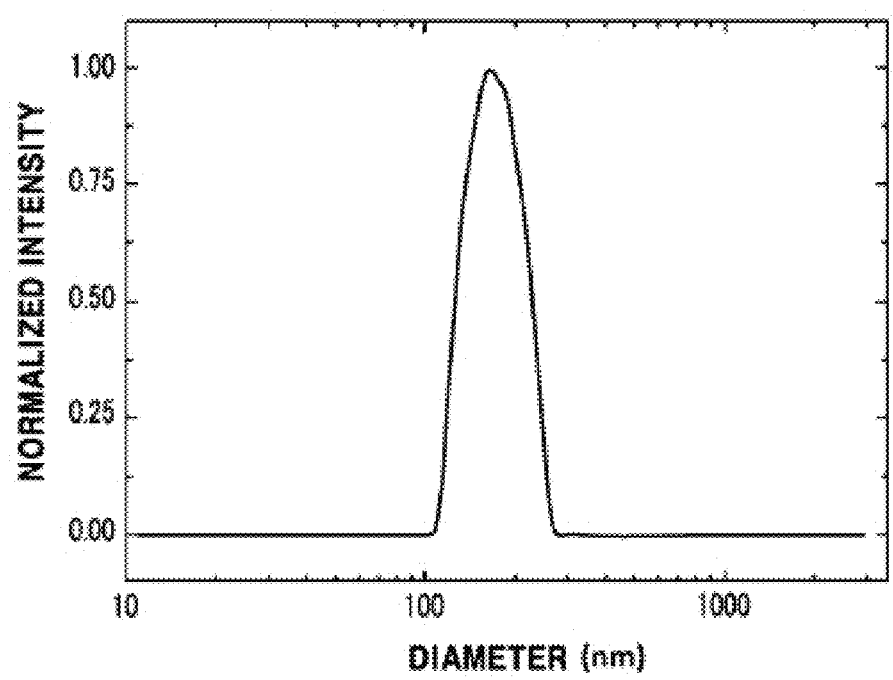
Figure 12A:
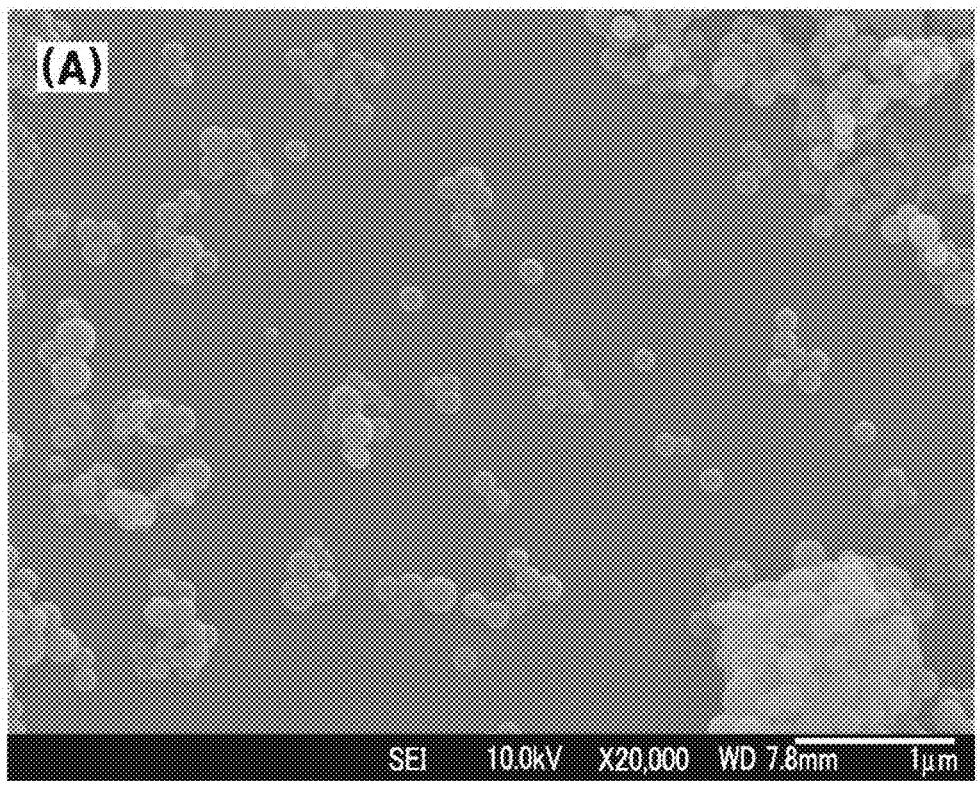
FIG. 12A and FIG. 12B are SEM images of polysulfide copolymer particles obtained using a myristyltrimethylammonium bromide (MTAB) surfactant (FIG. 12A) and a benzyl dodecyl dimethyl ammonium bromide (BDAB) surfactant (FIG. 12B), respectively, in accordance with an example of the present disclosure.
Figure 12B:
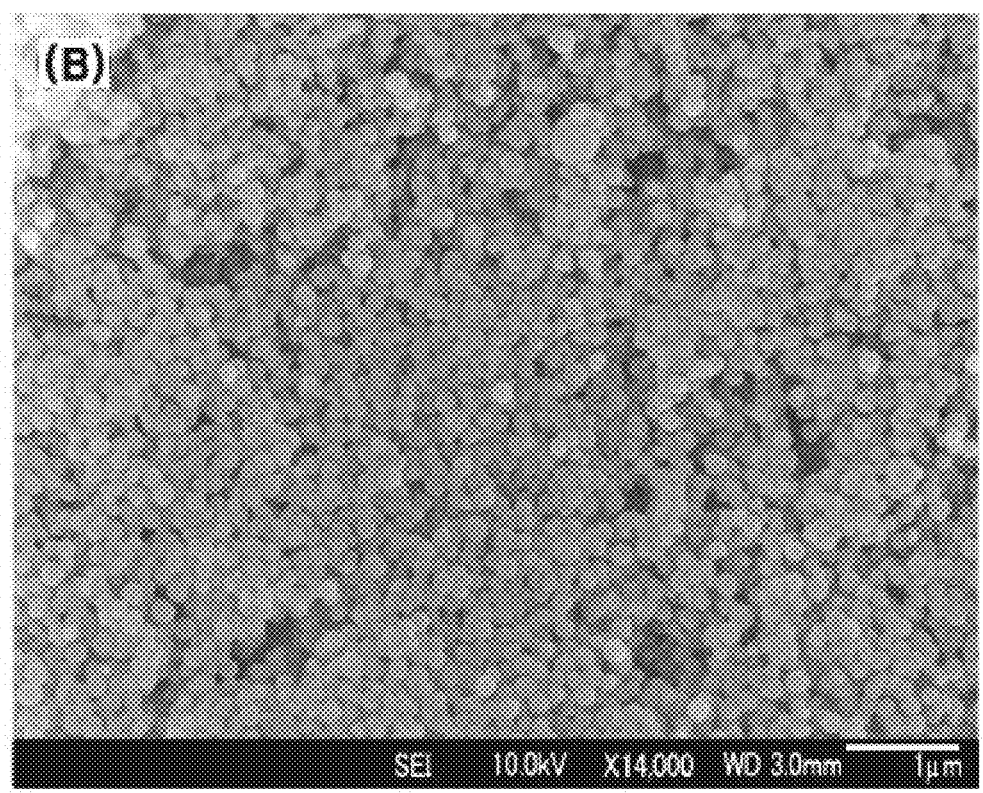

Then, the interfacial polycondensation was performed in the presence of an anionic [sodium dodecyl sulfide (SDS)] or cationic [cetyltrimethyl ammonium bromide (CTAB)] surfactant. Firstly, when polycondensation between the aqueous sodium polysulfide and TCP was performed in the presence of SDS (20 mM), it took 3 days for a yellow color of the reaction mixture to completely disappear, and the elapsed time was almost identical to that for the polycondensation without the presence of a surfactant, and the polycondensation between the aqueous sodium polysulfide and TCP was accompanied with formation of a cloudy white dispersion. The white solid could be isolated by centrifugation, and an SEM image thereof showed spherical particles [FIG. 11B]. However, as shown in the SEM and DLS results, an average size and size distribution of the particles may not be measured due to agglomeration. A time required for the color change and a remarkable change in morphology of the obtained product were observed when CTAB (20 mM) was used. When a sodium trisulfide solution including CTAB was processed at 30° C. using TCP, decoloring of the reaction mixture was observed within 4 hours, and when it was left alone, an unprecipitated cloudy white dispersion was obtained. As shown in the DLS results, a well-defined particle was observed as having an average hydrodynamic radius of 172.8±33.1 nm [FIG. 11D] through SEM [FIG. 11C]. The observation result may be attributed to a phase transfer catalytic effect of CTAB on a polysulfide anion and resultant stabilization of the obtained particle. The selection of a surfactant acting as both a dispersing agent and a phase transfer catalyst was crucial for the synthesis of a well-defined polysulfide copolymer particle, and similar results were obtained using other cationic surfactants such as myristyltrimethylammonium bromide (MTAB) and benzyldodecyldimethylammonium bromide (BDAB) (FIG. 12A and FIG. 12B).

Figure 13:
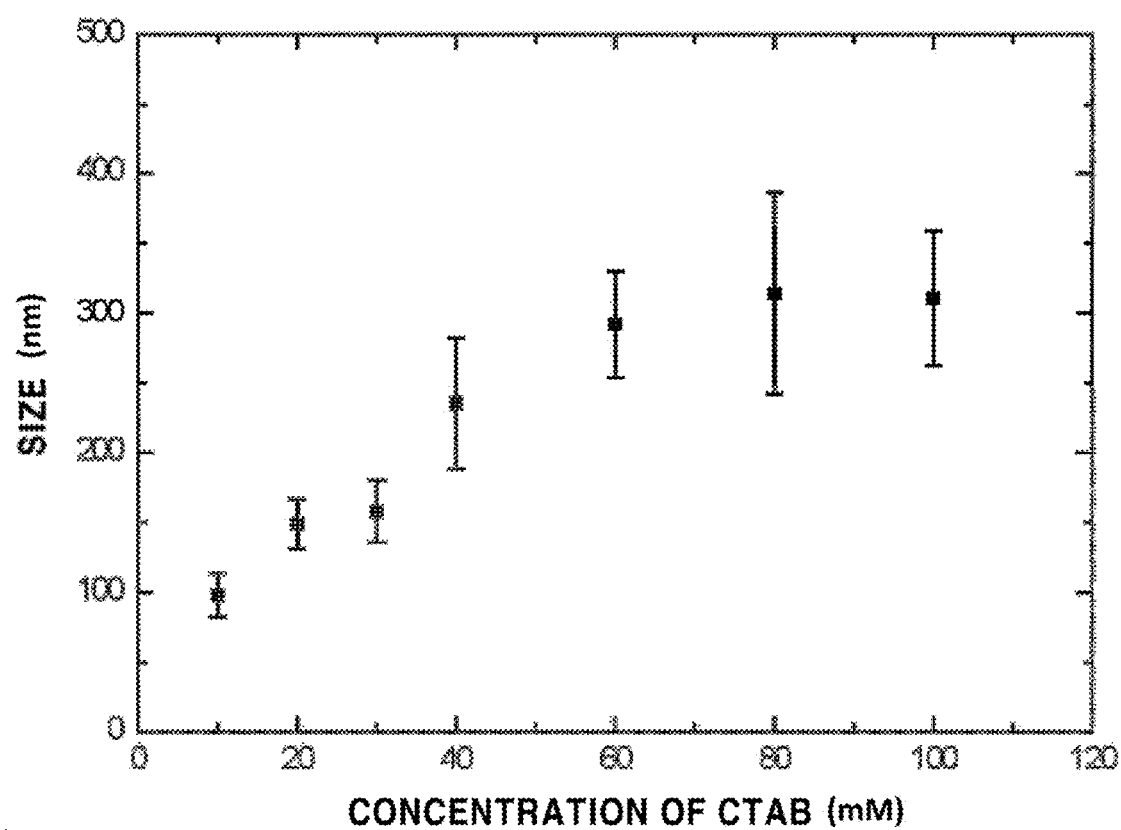
FIG. 13 is a graph showing a change in a size of a polysulfide copolymer particle prepared in the presence of CTAB at different concentrations in accordance with an example of the present disclosure.
Figure 14:
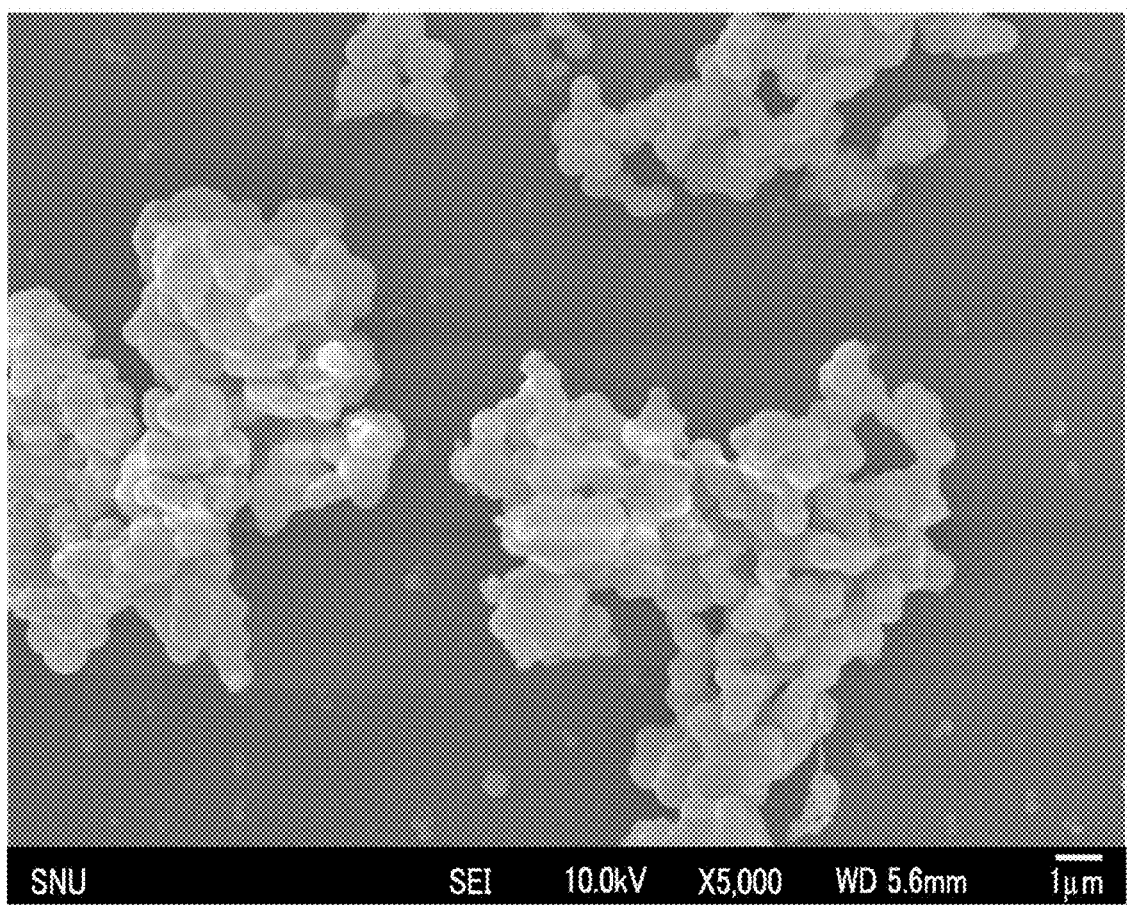
FIG. 14 is an SEM image of a polysulfide copolymer particle obtained in the presence of 5 mM CTAB in accordance with an example of the present disclosure.

In general, it is very difficult to adjust a size of a polysulfide copolymer particle obtained by interfacial polymerization, and this issue has been recently raised through the use of a membrane having an adjusted pore size. So far, however, a generalized size adjustment strategy for a polysulfide copolymer particle in a batch interfacial polymerization is limited to modification of a molecular weight of a monomer, which inevitably causes a compositional change within the polysulfide copolymer particle. In the interfacial polycondensation between sodium trisulfide and TCP, it was found that the size and morphology varied depending on a concentration of CTAB (FIG. 13). When CTAB had a concentration of less than 10 mM, a poorly defined material including noticeable agglomerates was obtained (FIG. 14), and when the concentration of CTAB was further increased, a bigger polysulfide copolymer particle was obtained. It was found that a size of the particle was most sharply increased at a concentration of CTAB in the range of 10 mM to 60 mM, and the average particle size was increased from 98 nm to 292 nm. An additional increase in concentration of CTAB did not cause a remarkable increase of the size, and the maximum size of the sulfur-rich particle that can be obtained by increasing the concentration of CTAB was about 320 nm. The observation result may be attributed to a free CTAB concentration for a phase transfer catalytic effect in a continuous phase during a reaction. When polysulfide copolymer particles are generated, positions of CTAB on the surfaces of these particles may induce the depletion of a continuous phase free phase transfer catalyst and thus significantly delay the polycondensation, and this process may be delayed by an increase in CTAB concentration up to a point where the concentration is not a limiting factor any longer.

As shown by the elemental analysis, localization of CTAB on a polysulfide particle surface is suggested by a highly positive ζ-potential of a particle solution and the presence of nitrogen (Table 5).

TABLE 5

| ENTRY | CARBON | HYDROGEN [%] | NITROGEN [%] | SULFUR [%] | ZETA POTENTIAL [mV] |
|---|---|---|---|---|---|
| AS PREPARED | 22.7 | 3.3 | 1.5 | 72.2 | +45.8 |
| AFTER WASHING[a] | 21.2 | 2.1 | 0.0 | 76.0 | −16.2 |

[a]By two cycles of centrifugation-redispersion in water.

However, a ζ-potential of the particle was remarkably changed to a slightly negative value after two cycles of centrifugation-redispersion in water, which shows that the surfactant can be easily removed from the particle surface. As previously suggested with respect to an end group of a polysulfide copolymer from alkyl dichloride, the slightly negative charge may be attributed to the presence of a hydroxy group from hydrolysis of alkyl dichloride on the surface of the polysulfide copolymer particle. An elemental analysis of the washed particle does not show even a small amount of nitrogen but shows a higher sulfur content relative to carbon, as compared with a particle directly isolated from the reaction mixture. The result is sufficiently weak to facilitate the removal of interactions between CTAB and the polysulfide copolymer particle, which implies that it is very attractive for additional applications.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A method of preparing a polysulfide copolymer particle, comprising:
preparing a mixture including a surfactant, a phase transfer catalyst, a polyfunctional monomer, and a polysulfide salt represented by the formula $X_2S_m$, in which X is an alkali metal cation or ammonium cation and m is a number from 1 to 10, the surfactant and the phase transfer catalyst being different; and
polymerizing the polysulfide salt with the polyfunctional monomer in the presence of the surfactant and the phase transfer catalyst to form a polysulfide polymer particle in the mixture.

2. The method of preparing a polysulfide copolymer particle of claim 1, wherein both a concentration of the surfactant and a concentration of the phase transfer catalyst are controlled to adjust a size of the polysulfide polymer particle formed.

3. The method of preparing a polysulfide copolymer particle of claim 1, wherein both a concentration of the surfactant and a concentration of the phase transfer catalyst are controlled so that the polysulfide polymer particle has a size of from about 470 nm to about 760 nm.

4. The method of preparing a polysulfide copolymer particle of claim 1, wherein the phase transfer catalyst includes tetrabutylammonium bromide (TBAB).

5. The method of preparing a polysulfide copolymer particle of claim 1, wherein the surfactant includes

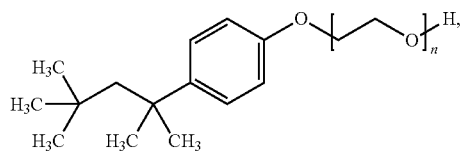

wherein n is an integer greater than zero.

6. The method of preparing a polysulfide copolymer particle of claim 1, wherein the surfactant includes a cationic surfactant.

7. The method of preparing a polysulfide copolymer particle of claim 6, wherein the cationic surfactant includes cetyltrimethyl ammonium bromide (CTAB).

8. The method of preparing a polysulfide copolymer particle of claim 1, wherein the polysulfide copolymer particle has a sulfur content of 65 wt % or more.

9. The method of preparing a polysulfide copolymer particle of claim 1, wherein the polysulfide copolymer particle has a size of from 1 nm to 1 μm.

10. The method of preparing a polysulfide copolymer particle of claim 1, wherein preparing the mixture including the surfactant, the phase transfer catalyst, the polyfunctional monomer, and the polysulfide salt includes:
preparing a sulfur-precursor solution containing the polysulfide salt, and
adding the surfactant, the phase transfer catalyst, and the polyfunctional monomer to the sulfur-precursor solution.

11. A method of preparing a polysulfide copolymer particle, comprising:
preparing a mixture including a surfactant, a polyfunctional monomer, and a polysulfide salt represented by the formula $X_2S_m$, in which X is an alkali metal cation or ammonium cation and m is a number from 1 to 10; and
forming a polysulfide polymer particle in the mixture by polymerizing the polysulfide salt with the polyfunctional monomer in the presence of the surfactant, wherein:
the surfactant acts as a dispersing agent and a phase transfer catalyst, and
a concentration of the surfactant is controlled to adjust a size of the polysulfide polymer particle formed.

12. The method of preparing a polysulfide copolymer particle of claim 11, wherein a concentration of the surfactant is controlled so that the polysulfide polymer particle has a size of from about 470 nm to about 760 nm.

13. The method of preparing a polysulfide copolymer particle of claim 11, wherein a molar ratio of the polysulfide salt to the surfactant is from 1:0.1 to 500.

14. The method of preparing a polysulfide copolymer particle of claim 11, wherein the surfactant includes a cationic surfactant.

15. The method of preparing a polysulfide copolymer particle of claim 14, wherein the cationic surfactant includes cetyltrimethylammonium sulfate bromide (CTAB), myristyltrimethylammonium bromide (MTAB), benzyl dodecyldimethylammonium bromide (BDAB), hexadecyltrimethylammonium bromide, tetraheptylammonium bromide, cetyltrimethylammonium stearate, benzyltributylammonium chloride, benzyltrietylammonium bromide, benzyltrimethylammonium bromide, phenyltrimethylammonium bromide, phenyltrimethylammonium iodide, tetrabutylammonium bromide, tetrabutylammonium chloride, tetrabutylammonium hydrogen sulfate, tetrabutylammonium iodide, tetraethylammonium bromide, tetrabutylammonium fluoride, or tetrabutylammonium tetrafluoroborate.

16. The method of preparing a polysulfide copolymer particle of claim 15, wherein the cationic surfactant includes the cetyltrimethyl ammonium bromide (CTAB).

17. The method of preparing a polysulfide copolymer particle of claim 11, wherein the polysulfide copolymer particle has a sulfur content of 65 wt % or more.

18. The method of preparing a polysulfide copolymer particle of claim 11, wherein the polysulfide copolymer particle has a size of from 1 nm to 1 μm.

19. The method of preparing a polysulfide copolymer particle of claim 11, wherein preparing the mixture including the surfactant, the polyfunctional monomer, and the polysulfide salt includes:
preparing a sulfur-precursor solution containing the polysulfide salt, and
adding the surfactant and the polyfunctional monomer to the sulfur-precursor solution.

* * * * *